Aug. 6, 1935.　　　　J. FUERST　　　　2,010,074
FOOD SERVING OR HANDLING IMPLEMENT
Filed April 16, 1935　　　2 Sheets-Sheet 2
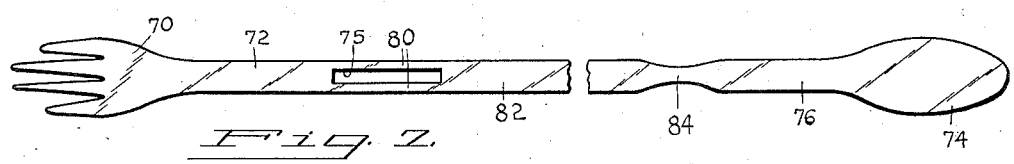
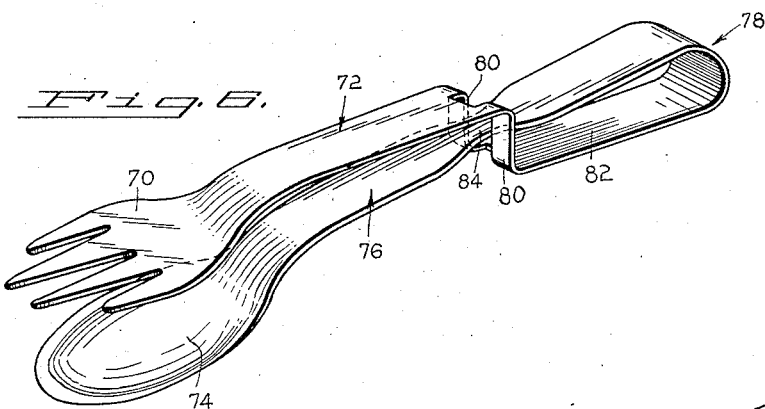
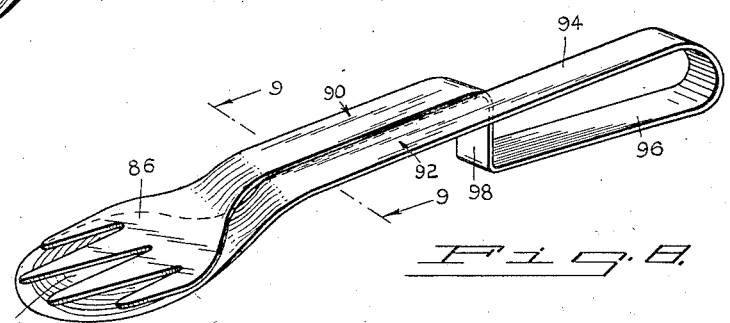
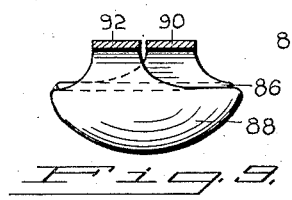
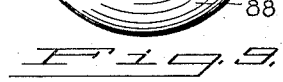
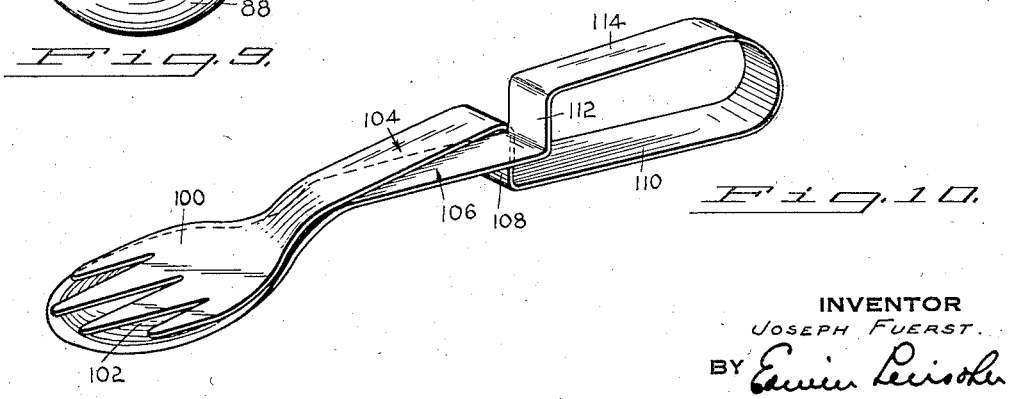
INVENTOR
JOSEPH FUERST.
BY
ATTORNEY Patented Aug. 6, 1935

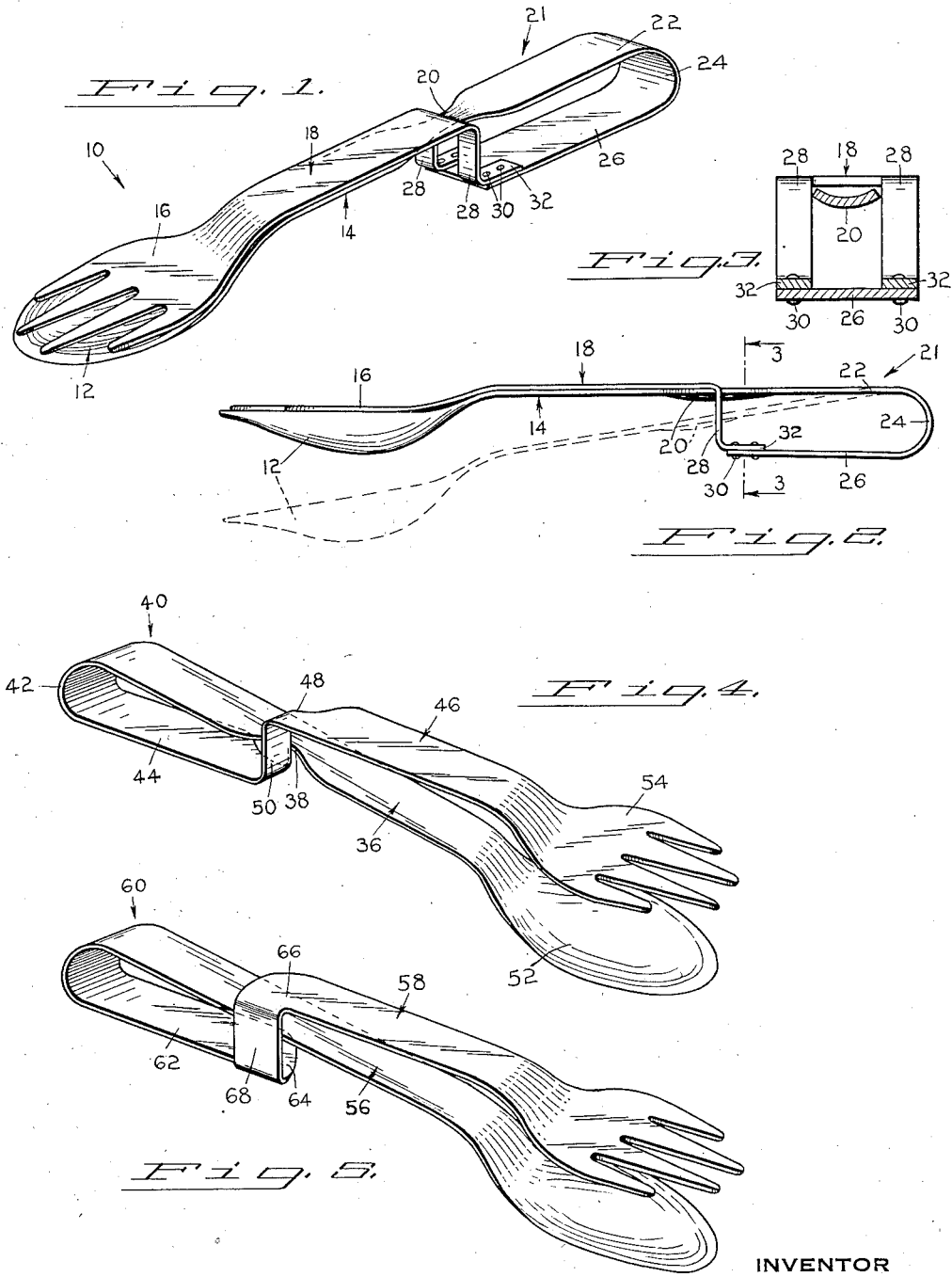

2,010,074

UNITED STATES PATENT OFFICE 2,010,074

FOOD SERVING OR HANDLING IMPLEMENT

Joseph Fuerst, New York, N. Y.

Application April 16, 1935, Serial No. 16,549

13 Claims. (Cl. 30—22)

The present invention relates to implements for serving or handling foods and has for its main object the provision in such implement of the qualities of simplicity of construction and convenience in use.

Another object of the invention is to provide a serving spoon with means for retaining in or on the bowl the food which is handled or served by said spoon.

Another object of the invention is to provide a food serving or handling implement with cooperating food-retaining members which are normally urged toward each other for the purpose of retaining articles of food therebetween.

A further object of the invention is to provide a food serving or handling implement of a one-piece sheet metal construction.

The above objects of the invention and other objects ancillary thereto will best be understood from the following description considered with reference to the accompanying drawings.

In the drawings:

Fig. 1 is a perspective view of an implement made according to one form of the invention;

Fig. 2 is a side view of the implement shown in Fig. 1, with parts shown in dotted lines to illustrate the manner of using said implement;

Fig. 3 is a transverse sectional view on the line 3—3 of Fig. 2;

Fig. 4 is a perspective view of an implement made according to another form of the invention, illustrating the food-retaining members separated from each other;

Fig. 5 is a view similar to Fig. 4 illustrating a further form of the invention;

Fig. 6 is a perspective view of an implement made according to a further modification and illustrating the food-retaining members separated from each other;

Fig. 7 is a plan view of a sheet metal stamping from which the implement shown in Fig. 6 is formed;

Fig. 8 is a perspective view of an implement made according to a further form of the invention;

Fig. 9 is a transverse sectional view on the line 9—9 of Fig. 8;

Fig. 10 is a perspective view of an implement constituting another embodiment of the invention.

In the construction shown in Figs. 1 to 3 the serving implement 10 comprises a spoon having a bowl 12 and a handle 14, and a fork provided with a tine portion 16 and a handle 18 which, as here shown, are disposed in overlying relation to the bowl and handle, respectively, of the spoon. The spoon handle 14 is provided with a reduced intermediate portion 20 which is curved or ribbed, as shown, to increase the resistance of said portion to the bending thereof, thus compensating for the decrease in its width. The spoon handle 14 extends rearwardly beyond said reduced portion 20 and includes a spring 21 which comprises the portion 22, which is reflexed forwardly, the curved portion 24, and the forwardly-directed portion 26, which terminates at its forward edge in the region of the intermediate reduced portion 20. The rear end of the fork handle 18 terminates substantially at the reduced portion 20 of the spoon handle 14 and is provided with downwardly-reflexed and laterally spaced portions 28 which straddle said reduced portion 20 of the spoon handle and are rigidly secured to the portion 26 of the spring 21 in any suitable manner, as by rivets 30 which engage said portion 26 and the bases 32 of said straddle portions 28.

In using the food serving or handling implement 10, the food-retaining members constituted by the spoon bowl 12 and the tine portion 16 of the fork are separated, as illustrated in Fig. 2, by compressing the spring 21. Then the food is positioned in or on the bowl 12 and, upon release of the spring 21, the spoon bowl and the tine portion of the fork automatically move toward each other under the influence of said spring 21, whereby the food is gently gripped and held between said food-retaining members 12 and 16. The food thus held may be served from one plate or receptacle to another at the table or in the kitchen and released from the implement by again pressing upon the spring portion 21 to separate the food-retaining members and thereby moving them to food-releasing position.

In the forms of the invention illustrated in Figs. 4 to 10, the implement is of one-piece construction. As illustrated in Fig. 4, the spoon handle 36 is provided with an intermediate reduced portion 38 and is reflexed at its rear portion to provide a spring 40 including the bent portion 42 and the forwardly-directed portion 44, and the fork handle 46 is provided with a reduced portion 48 in the region of the reduced portion 38 of the spoon handle 36 and a vertical portion 50 which is integral with the spring portion 44. By reason of the provision of the reduced portions 38 and 48 of the spoon and fork handles 36 and 46, respectively, the fork handle 46 is disposed in overlying relation to the spoon handle 36 and the tine portion 54 of the fork is also arranged in such relation with respect to the spoon bowl 52. The implement of this construction is used in the same manner as the implement 10 illustrated in Figs. 1 to 3, the food-retaining members constituted by the spoon bowl 52 and the fork tine portion 54 being shown in their relative positions when the spring 40 is compressed to move them apart for the purpose of admitting food articles therebetween.

In the construction illustrated in Fig. 5, the spoon and fork handles 56 and 58, respectively, are bent into the form shown to provide the spring 60 and to dispose the fork handle 58 in overlying relation to the spoon handle 56 without reducing the width of either of said handles. Accordingly, as here shown, the forwardly-extending portion 62 of the spring 60 is bent laterally in its own plane, as indicated at 64, and the rear portion of the fork handle 58 is similarly bent in its own plane, as indicated at 66, said laterally-directed portions 64 and 66 being united by the integral vertically-extending connecting portion 68.

In the form of the invention illustrated in Fig. 6, the implement is similar in construction to the implement illustrated in Figs. 1 to 3 with the exception that in the modified construction, as here shown, the several parts of the implement are initially and finally integral with each other, being formed from the one-piece metal stamping illustrated in Fig. 7. The fork tine portion 70 and the fork handle 72 are disposed in overlying relation to the spoon bowl 74 and the spoon handle 76, respectively, and said members are in integral relation with the spring 78. This is accomplished by providing the vertically-directed and laterally-spaced members 80 in integral relation to the rear end of the fork handle 72 and the front end of the forwardly-directed spring portion 82, the intermediate portion 84 of the spoon handle being reduced to permit free movement of the spoon handle between said spaced members 80. The implement, as thus constructed, is made from the sheet metal stamping illustrated in Fig. 7, the parts of said blank which form the several parts of the implement being designated by the same reference characters as those utilized in the description of Fig. 6.

Referring to Fig. 7, it will be observed that the stamping is provided with an elongated opening 75 defined by laterally-spaced members 80, the rear end of the fork handle 72 and the forward end of the spring portion 82. In forming the implement from this blank, the spoon bowl 74 and the spoon handle 76 are twisted into a plane substantially at right angles to the blank of the fork handle 72 and the spring portion 82 to permit the said portions to be projected through the opening 75 after which said portions are untwisted into a plane substantially parallel with the overlying fork portions of the implement.

Then, after the spoon bowl and fork tine portions, as well as the other portions of the implement are properly shaped and bent into the desired form, the implement is tempered to resist permanent deformations of any of the parts thereof and to provide proper resiliency in the spring portion 78.

In the form of the invention illustrated in Figs. 8 and 9, the fork tine portion 86 is disposed in overlying relation to the spoon bowl portion 88, but the fork handle 90 is not disposed in overlying relation to the spoon handle 92. As here shown, the spoon and fork handle portions are disposed laterally of each other, substantially in the same plane, and with their adjacent longitudinal edges slightly spaced from each other to permit free movement thereof. This relation of the parts is afforded by disposing the spring portions 94 and 96 in crossed relation whereby the integral connecting portion 98 is disposed laterally of the edge of the bowl handle 92, which is nearest the adjacent edge of the fork handle 90, and by shaping the spoon bowl 88 and the fork tine portion 86 so that they extend laterally from the remote edges of said handles 90 and 92.

In the construction illustrated in Fig. 10, the fork tine portion 100 is disposed in overlying relation to the spoon bowl 102 and their handles 104 and 106, respectively, are arranged partly in such relation and partly in laterally displaced or crossing relation so that at their rear ends they are disposed laterally of each other. The rear portion 108 of the fork handle is reflexed downwardly and is in integral relation with the spring portion 110, while the rear end of the spoon handle 106 is provided with an upwardly-reflexed portion 112 in integral relation with the spring portion 114.

Thus it is apparent that the several embodiments herein shown and described are well adapted to accomplish the several objects of the invention. In particular, it will be observed that in each form of the invention the food-retaining members are normally urged toward or into engagement with each other by a spring member which is preferably integral with one or both of the handles of the food-retaining members, the construction being such that upon release of pressure on the spring, the food-retaining members are automatically effective to hold the food therebetween. Each of the constructions here shown may be made of metal stampings and by simple bending and shaping operations well known to those skilled in the art of sheet metal working and to the art to which the present invention more specifically relates. It will also be apparent that by the use of an implement embodying the present invention, the serving of foods can be greatly facilitated and made more convenient since an implement made according to the present invention can be manipulated with one hand thereby obviating the use of both hands heretofore necessary in serving or handling food by means of a serving spoon and fork. It will be noticed further that the fork does not interfere with the use of the spoon in serving or handling liquids and that for serving or handling liquids it is unnecessary to move the food-retaining members apart, although this may be done if desired, since the fork tine portions provide inlets for the passage of liquid into the spoon bowl. It will also be observed that in each of the forms of the invention, the implement is provided with a vertically-offset portion, as for example, the offset portion constituted by the members 28 in the construction of Fig. 1, by the portion 98 in the construction shown in Fig. 8, and the similar portions in the constructions shown in the other forms of the invention, said offset portion having the function of retaining the implement in engagement with the rim of a receptacle of suitable depth, whereby the implement is prevented from slipping into the contents of such receptacles. In the construction illustrated in Fig. 10, the implement is provided with two such offset portions, which in this case are constituted by the portion 108 and portion 112, so that either of said portions will have the same purpose as the offset portions of the other forms of the invention. Further, it will be observed that in each of the forms of the present invention, the implement may be disposed with the spoon bowl in overlying relation to the fork tine portion whereby the food may be supported upon said fork portion, especially when it is desired to separate certain solid food portions from the liquid in which such food is prepared. Other ways of utilizing the implements herein illustrated will suggest themselves, and food retaining members of other forms may be substituted for either the spoon or fork or for both of them.

While I have shown and described several embodiments of the invention, it will be understood that the invention may assume other specific forms than those herein disclosed and that certain changes in each of the embodiments herein illustrated may be made. Therefore, I do not wish to be limited to the precise constructions herein disclosed except as may be required by the appended claims and the prior art.

What I claim and desire to secure by Letters Patent of the United States is:

1. A food handling implement comprising cooperating food-retaining members adapted to releasably retain food therebetween, handles for said members, one of said handles having a forwardly reflexed portion which underlies another part of said handle to form a spring, the food-retaining member carried by the other handle overlying the food-retaining member of the handle having said reflexed portion and said other handle having a fixed connection with said reflexed portion whereby said food-retaining members are urged toward each other.

2. A food handling implement comprising cooperating food-retaining members adapted to releasably retain food therebetween, handles for said members, one of said handles having a forwardly reflexed portion forming a spring, and the other handle having spaced members which straddle said handle having said reflexed portion, said spaced members having a fixed connection with said reflexed portion whereby said spring normally urges said food-retaining members toward each other.

3. A food handling implement comprising cooperating food-retaining members adapted to releasably retain food therebetween, handles for said members, one of said handles having a reduced intermediate portion and a rear portion which is forwardly reflexed forming a spring, and the other handle having means defining an opening through which said reduced intermediate portion extends, said other handle having a fixed connection with said spring whereby said food-retaining members are urged toward each other by said spring.

4. A food handling implement comprising cooperating food-retaining members adapted to releasably retain food therebetween, handles for said members, one of said handles having a reduced intermediate portion and a rear portion which is forwardly reflexed forming a spring, and the other handle having means defining an opening through which said reduced intermediate portion extends, said other handle having an operative connection with said spring whereby said food-retaining members are urged toward each other by said spring.

5. A food handling implement comprising cooperating food-retaining members adapted to releasably retain food therebetween, handles for said members, one of said handles having a forwardly reflexed portion forming a spring, and the other handle having spaced members which straddle said handle having said reflexed portion, said spaced members having an operative connection with said reflexed portion whereby said spring normally urges said food-retaining members toward each other.

6. A food handling implement comprising cooperating food-retaining members adapted to releasably retain food therebetween, handles for said members, and spring means integral with both of said handles for urging said food-retaining members relatively toward each other, one of said handles having an opening therein, and the other handle extending through said opening.

7. A food handling implement comprising cooperating food-retaining members adapted to releasably retain food therebetween, handles for said members, one of said handles having a forwardly reflexed portion which underlies another part of said handle to form a spring, the food-retaining member carried by the other handle overlying the food-retaining member of the handle having said reflexed portion, and said other handle having a laterally offset portion having an operative connection with said reflexed portion and movable transversely of and adjacent to the edge of said first handle.

8. A food handling implement comprising cooperating food-retaining members adapted to releasably retain food therebetween, handles for said members, one of said handles having a forwardly reflexed portion which underlies another part of said handle to form a spring, the food-retaining member carried by the other handle overlying the food-retaining member of the handle having said reflexed portion, and said other handle having a laterally offset portion integral with said reflexed portion and movable transversely of and adjacent to the edge of said first handle.

9. A food handling implement comprising a spoon provided with a handle having an underlying forwardly-reflexed spring portion, and a food-retaining member overlying the bowl of said spoon and provided with a handle joined to said underlying reflexed spring portion whereby said food-retaining member is urged toward the bowl of said spoon.

10. A food handling implement comprising a spoon provided with a handle having an underlying forwardly-reflexed spring portion, and a fork having a tine portion overlying the bowl of said spoon and a handle joined to said underlying reflexed-spring portion whereby said fork is urged toward the bowl of said spoon.

11. A food handling implement comprising a spoon provided with a handle having an underlying forwardly-reflexed spring portion and an opening in said handle adjacent said reflexed portion, and a fork having a tine portion overlying the bowl of said spoon and a handle extending through said opening and joined to said reflexed portion.

12. A food handling implement comprising a spoon provided with a handle having an integral rear part provided with an underlying forwardly-reflexed portion forming a spring, and a fork having a tine portion overlying the bowl of said spoon and a handle disposed laterally of the handle of said spoon and joined to said reflexed portion.

13. A food handling implement comprising a spoon provided with a bowl and a handle having an integral rear part provided with an underlying forwardly-reflexed portion forming a spring, and a food-retaining member having a portion overlying said bowl and adapted to engage the latter, and a handle fixedly united with said spring whereby said food-retaining member is urged toward said bowl, said overlying portion of the food-retaining member having an opening therein to permit the ready passage of liquid into and out of the spoon when said overlying portion is in engagement with said bowl.

JOSEPH FUERST.